US 8,666,095 B2

(12) United States Patent
Hanzlik et al.

(10) Patent No.: US 8,666,095 B2
(45) Date of Patent: Mar. 4, 2014

(54) FAST PRECISION CHARGE PUMP

(75) Inventors: Tomasz E. Hanzlik, Wroclaw (PL); Jens Kristian Poulsen, Kitchener (CA)

(73) Assignee: Epcos Pte Ltd, Singapore (SG)

( * ) Notice: Subject to any disclaimer, the term of this patent is extended or adjusted under 35 U.S.C. 154(b) by 626 days.

(21) Appl. No.: 12/991,164

(22) PCT Filed: May 4, 2009

(86) PCT No.: PCT/EP2009/055346
§ 371 (c)(1),
(2), (4) Date: Jan. 18, 2011

(87) PCT Pub. No.: WO2009/135815
PCT Pub. Date: Nov. 12, 2009

(65) Prior Publication Data
US 2011/0170714 A1 Jul. 14, 2011

Related U.S. Application Data

(60) Provisional application No. 61/126,491, filed on May 5, 2008.

(51) Int. Cl.
*H04R 3/00* (2006.01)
(52) U.S. Cl.
USPC .................................. 381/111; 381/113
(58) Field of Classification Search
USPC .................. 381/111, 113, 122, 191, 174; 365/185.18
See application file for complete search history.

(56) References Cited

U.S. PATENT DOCUMENTS

| 5,280,543 | A | * | 1/1994 | Yokoyama et al. | ............. | 381/96 |
| 5,694,072 | A | | 12/1997 | Hsiao et al. | | |
| 2004/0080361 | A1 | | 4/2004 | Henry | | |
| 2004/0251955 | A1 | | 12/2004 | Neidorff | | |
| 2005/0213781 | A1 | | 9/2005 | Suzuki et al. | | |
| 2006/0013044 | A1 | | 1/2006 | Cheung | | |
| 2006/0147061 | A1 | | 7/2006 | Niwa et al. | | |
| 2007/0127743 | A1 | * | 6/2007 | Kato et al. | ..................... | 381/120 |
| 2007/0160234 | A1 | | 7/2007 | Deruginsky et al. | | |

(Continued)

FOREIGN PATENT DOCUMENTS

EP 1599067 A2 11/2005
JP 08-182092 12/1996

(Continued)

OTHER PUBLICATIONS

Written Opinion corresponding to International Patent Application No. PCT/EP2009/055346, European Patent Office, dated Jul. 28, 2009, 6 pages.

(Continued)

*Primary Examiner* — Vivian Chin
*Assistant Examiner* — Friedrich W Fahnert
(74) *Attorney, Agent, or Firm* — Nixon Peabody LLP

(57) ABSTRACT

The present invention relates to a condenser microphone assembly comprising a capacitive electro-acoustic transducer element comprising a diaphragm and a back-plate operatively connected to a DC bias voltage, a fast charge pump adapted to generate the DC bias voltage, and a controllable or programmable current source operatively connected to the DC bias voltage to draw a predetermined DC current there from. The controllable or programmable current source is responsive to a difference between a representative of a detected DC bias voltage and a DC reference voltage.

20 Claims, 4 Drawing Sheets

(56) References Cited

U.S. PATENT DOCUMENTS

| | | |
|---|---|---|
| 2008/0075306 A1* | 3/2008 | Poulsen et al. ............... 381/111 |
| 2008/0094861 A1* | 4/2008 | Wang ......................... 363/21.11 |
| 2008/0224627 A1 | 9/2008 | Genest |
| 2009/0003629 A1 | 1/2009 | Shajaan et al. |
| 2009/0316935 A1* | 12/2009 | Furst et al. ................... 381/111 |

FOREIGN PATENT DOCUMENTS

| | | |
|---|---|---|
| JP | 2000-194431 | 7/2000 |
| JP | 2006-191359 | 7/2006 |
| JP | 2007-512793 | 5/2007 |
| JP | 2008-153981 A | 7/2008 |
| WO | 2005/055406 A1 | 6/2005 |

OTHER PUBLICATIONS

International Search Report corresponding to International Patent Application No. PCT/EP2009/055346, European Patent Office, dated Jul. 28, 2009, 3 pages.

* cited by examiner

FAST PRECISION CHARGE PUMP

CROSS-REFERENCE TO RELATED APPLICATIONS

This application is a U.S. National Stage of International Application No. PCT/EP2009/055346, filed May 4, 2009, which claims the benefit of U.S. Provisional Application No. 61/126,491, filed on May 5, 2008, both of which are incorporated herein by reference in their entireties.

FIELD OF THE INVENTION

The present invention relates to semiconductor integrated circuit devices for use in charge pump circuits. In particular, the present invention relates to charge pump designs capable of dramatically improving the ramp-up time of a DC voltage, such as a DC bias voltage for a capacitive electro-acoustic transducer element.

BACKGROUND OF THE INVENTION

Charge pumps or voltage multipliers are generally known in the art of integrated circuit design and have been used for high voltage generation for various applications, such as EEPROMs, flash memories and DC bias voltage generation for condenser microphones. In integrated circuit designs of today, the charge pump is typically operated from a set of non-overlapping clock signals.

An intrinsic disadvantage of prior art charge pumps used for biasing of condenser microphones such as MEMS/silicon condenser microphones is a large ramp-up time of the DC output voltage from the charge pump. The large ramp-up time is caused by high source impedance associated with the charge pump and large capacitive loads at the output of the charge pump. A large portion of the capacitive load is often associated with the capacitance of the capacitive electro-acoustic transducer element.

An object of embodiments of the present invention is to provide a charge pump for biasing condenser microphones. The charge pump has a reduced ramp-up time of the charge pump DC output voltage compared to prior art charge pumps.

Another object of embodiments of the present invention is to provide a charge pump facilitating accurate setting of the DC output voltage to a desired voltage.

DESCRIPTION OF THE INVENTION

The above-mentioned objects are complied with by providing, in a first aspect, a condenser microphone assembly comprising a capacitive electro-acoustic transducer element, a charge pump, and a controllable or programmable current source. The capacitive electro-acoustic transducer element comprises a diaphragm and a back-plate operatively connected to a DC bias voltage. The charge pump is adapted to generate the DC bias voltage. The controllable or programmable current source is operatively connected to the DC bias voltage to draw a predetermined DC current there from so as to maintain a low output impedance of the charge pump under start-up and steady-state load.

According to one embodiment of the invention, the controllable or programmable current source is arranged or programmed to draw a substantially constant amount of DC current, such as a DC current between 0.1 nA and 10 nA, from the DC bias voltage.

In another embodiment, the controllable or programmable current source is responsive to a difference between a representative of a detected DC bias voltage and a DC reference voltage. Thus, the current drawn from the DC bias voltage by the current source is controlled in response to a difference between a detected DC bias voltage and a desired DC voltage. For miniature capacitive electro-acoustic transducer elements, the current load will for most applications not exceed 10 nA and preferably be less than 1 nA.

Preferably, the electro-acoustic transducer element may comprise a conventional condenser transducer fabricated by machining and assembly of individual plastic and metallic elements. Alternatively, the electro-acoustic transducer element may comprise a microelectromechanical (MEMS) or silicon transducer element fabricated by semiconductor processing techniques.

The charge pump is preferably adapted to generate a DC bias voltage within the range 5-20V such as between 8-12V, such as approximately 10V.

In order to detect or measure a DC bias voltage, a voltage divider may be provided. By using a voltage divider only a predetermined fraction, such as for example 20%, of the actual DC bias voltage is used as the representative of the DC bias voltage. The voltage divider may be operatively connected to the DC bias voltage of the charge pump so as to generate the representative of the detected DC bias voltage directly there from. The voltage divider preferably represents a very small DC load impedance to the charge pump output. The voltage divider may comprise a cascade or string of reverse biased diodes or a cascade of capacitors.

The condenser microphone assembly may further comprise an error amplifier for comparing the representative of the detected DC bias voltage and the DC reference voltage. The error amplifier is adapted to generate a control signal in response to the comparison and apply the control signal to control the current load of the current source. In addition, the condenser microphone assembly may further comprise a voltage generator adapted to generate the DC reference voltage.

Preferably, the DC bias voltage is connected to the electro-acoustic transducer element via a high impedance circuit. The high impedance circuit may comprise one or several semiconductor diodes, such as for example a pair of cross-coupled diodes. The cross-coupled diodes may exhibit an impedance in the TΩ or GΩ range under steady-state operational conditions, i.e. after ramp-up of the DC bias voltage and under normal operation of the condenser microphone assembly, in order to provide an essentially constant charge state of the transducer element.

The condenser microphone assembly may further comprise a noise filtration capacitor. The noise filtration capacitor is coupled in parallel with the current source.

Signal processing circuitry operationally connected to the electro-acoustic transducer element may be provided as well. The signal processing circuitry may be arranged to process signals generated by the transducer element. The signal processing circuitry may comprise a buffer and/or preamplifier operationally connected to the electro-acoustic transducer. Moreover, the signal processing circuitry may further comprise an A/D converter operationally connected to the buffer or the preamplifier and arranged to digitize incoming sound signals of the condenser microphone assembly.

Preferably, the signal processing circuitry, the A/D converter, and the charge pump are provided on a common semiconductor die or substrate for example in form of a CMOS, bipolar or BiCMOS ASIC. Optionally, the semiconductor die may further comprise a MEMS fabricated electro-acoustic transducer element to provide a single die MEMS condenser microphone assembly.

In a second aspect, the present invention relates to a DC voltage supply circuitry for generating a DC bias voltage for being applied as a DC voltage difference between a diaphragm and a back-plate of an associated capacitive electro-acoustic transducer element. The DC voltage supply circuitry comprises a circuit die and a controllable or programmable current source. The circuit die comprises a charge pump for generating and providing the DC bias voltage. The controllable or programmable current source is operatively connected to the DC bias voltage.

The associated electro-acoustic transducer element is a non-electret MEMS microphone transducer element. The charge pump generates a DC bias voltage within the range 5-20V such as between 8-12V, such as approximately 10V.

Preferably, the current source is controllable in response to a comparison between a representative of a detected DC bias voltage and a DC reference voltage. A voltage divider operatively connected to the DC bias voltage may provide the representative of the detected DC bias voltage. A voltage generator adapted to generate the reference DC voltage may be provided as well.

The DC supply circuitry may further comprise error amplifier means for comparing the representative of the detected DC bias voltage and the reference DC voltage. The error amplifier means being adapted to generate a control signal in response to the comparison and apply said control signal to control the controllable current source.

Moreover, a noise filtration capacitor coupled in parallel with the current source may be provided.

In a third aspect, the present invention relates to a method for generating a DC bias voltage to be applied as a DC voltage difference between a diaphragm and a back-plate of a capacitive electro-acoustic transducer element. The method comprises the steps of applying a clock signal to a charge pump for generating and providing the DC bias voltage, providing the DC bias voltage to a controllable or programmable current source, comparing a representative of a detected DC bias voltage and a reference DC voltage, generating, in response to said comparison, a control signal, and controlling the current source in response to the control signal.

In case the representative of the detected DC bias voltage is smaller than the reference DC voltage a current load of the current source falls within a first current range. Alternatively, if the representative of the detected DC bias voltage is higher than the reference DC voltage a current load of the current source falls within a second current range. Current loads of the second current range may be higher than current loads of the first current range.

In a four aspect, the present invention relates to a condenser microphone assembly comprising an electro-acoustic transducer element, a semiconductor die, and a controllable or programmable current source. The electro-acoustic transducer element comprises a diaphragm and a back-plate. The semiconductor die comprises a voltage multiplier for generating and providing a DC bias voltage via an output terminal. The DC bias voltage is applied as a DC voltage difference between the diaphragm and the back-plate. The controllable or programmable current source is operatively connected to the output terminal of the voltage multiplier. The controllable or programmable current source is controllable in response to a comparison between a representative of a detected DC bias voltage level and a reference voltage level.

BRIEF DESCRIPTION OF THE DRAWINGS

Various embodiments of the present invention will now be described in further details with reference to the accompanying figures, wherein.

Figure 1:
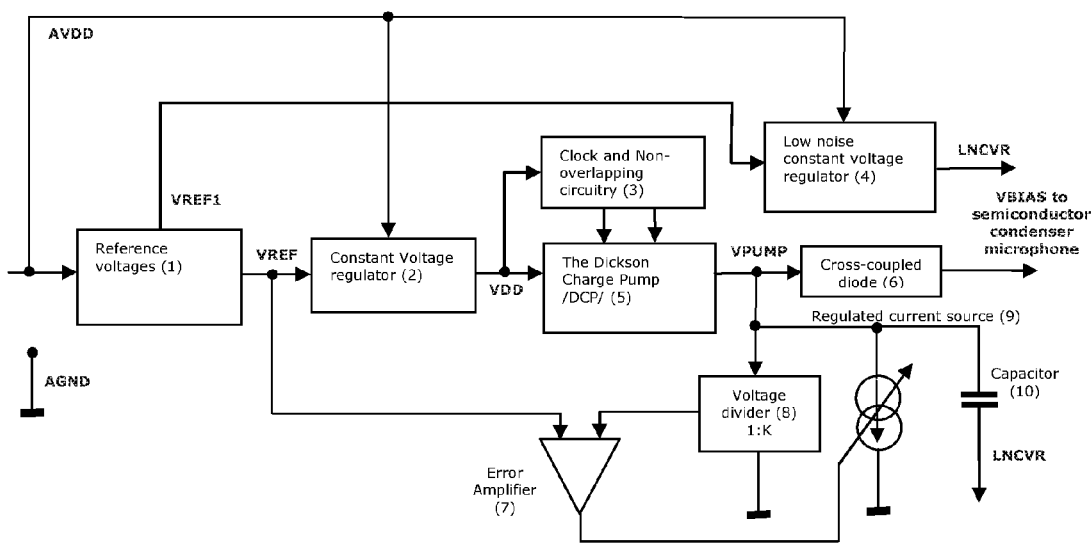
FIG. 1 shows a schematic block diagram of a regulated charge pump.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE DRAWINGS

The present invention relates to semiconductor integrated circuit devices for use in charge pump circuits. In particular, the present invention relates to charge pump designs capable of dramatically improving the ramp-up time of a DC voltage generated by a charge pump circuit.

In general, a charge pump as shown in FIG. 1 is a closed-loop system in that the pump output is regulated at a predetermined level. To achieve the regulation, the pump 5 must be kept turned on continuously over time. If the pump DC output voltage, VPUMP, of FIG. 1 reaches or exceeds a predetermined voltage level, then excess charge from the pump output must be removed by the controllable current source 9. Unwanted output noise is generated by the clocking of the charge pump and other noise sources such as thermal noise. This output noise is partially rejected by the noise-filtering capacitor 10 and by a pair of cross-coupled diodes 6 acting as a GΩ or TΩ resistor in steady-state. The latter extremely large resistance is necessary in order to ensure that the associated capacitive electro-acoustic transducer element is operated under essentially constant charge conditions.

A basic block diagram of an embodiment of the invention is shown in FIG. 1. Assuming that the pump output voltage is starting from zero at start-up, the load current of the regulator is very low. This means that the pump DC output voltage is lower than the predetermined voltage level. The output of the charge pump will begin to ramp-up towards the desired or target DC output voltage. During this time, a voltage divider 8 is enabled to constantly track the pump DC output voltage and an error amplifier 7 compares the DC output voltage with a reference voltage, VREF. The reference voltage, VREF, is generated by a reference voltage generator 1.

When the pump DC output voltage reaches or exceeds the predetermined voltage level, the error amplifier 7 increases the load current accordingly. The proposed current load regulation is an efficient, fast and reliable way to control the pump DC output voltage. The voltage divider 8 can be implemented in various ways but it is important that the divider represent an absolute minimal DC current load of the charge pump output.

This can for example be accomplished by a tapped string of reverse biased poly-diodes or a tapped string of capacitors with no DC paths to ground or the substrate. The charge pump is kept running during activation of the current load.

As previously stated, a schematic block diagram of an embodiment of the present invention is depicted in FIG. 1. As seen, the fast and low noise charge pump depicted in FIG. 1 involves a reference voltage generator 1, an auxiliary constant voltage regulator 3, a pump clock source and non-overlapping clock generator 3, a low noise constant voltage regulator 4, a voltage multiplier circuit embodied as a Dickson charge pump 5, a pair of cross-coupled diodes 6 for ensuring extremely high charge source impedance, an error amplifier with very high impedance inputs 7, a voltage divider 8, a controllable current source 9, and a noise-filtering capacitor 10. The DC bias voltage for the associated condenser microphone (not shown) is provided as a DC voltage difference between a diaphragm and a back-plate. In the present embodiment of the invention, the DC bias voltage is derived from VPUMP and provided through the cross-coupled diodes 6. The DC bias voltage will typically be around 5 to 10V.

Figure 2:
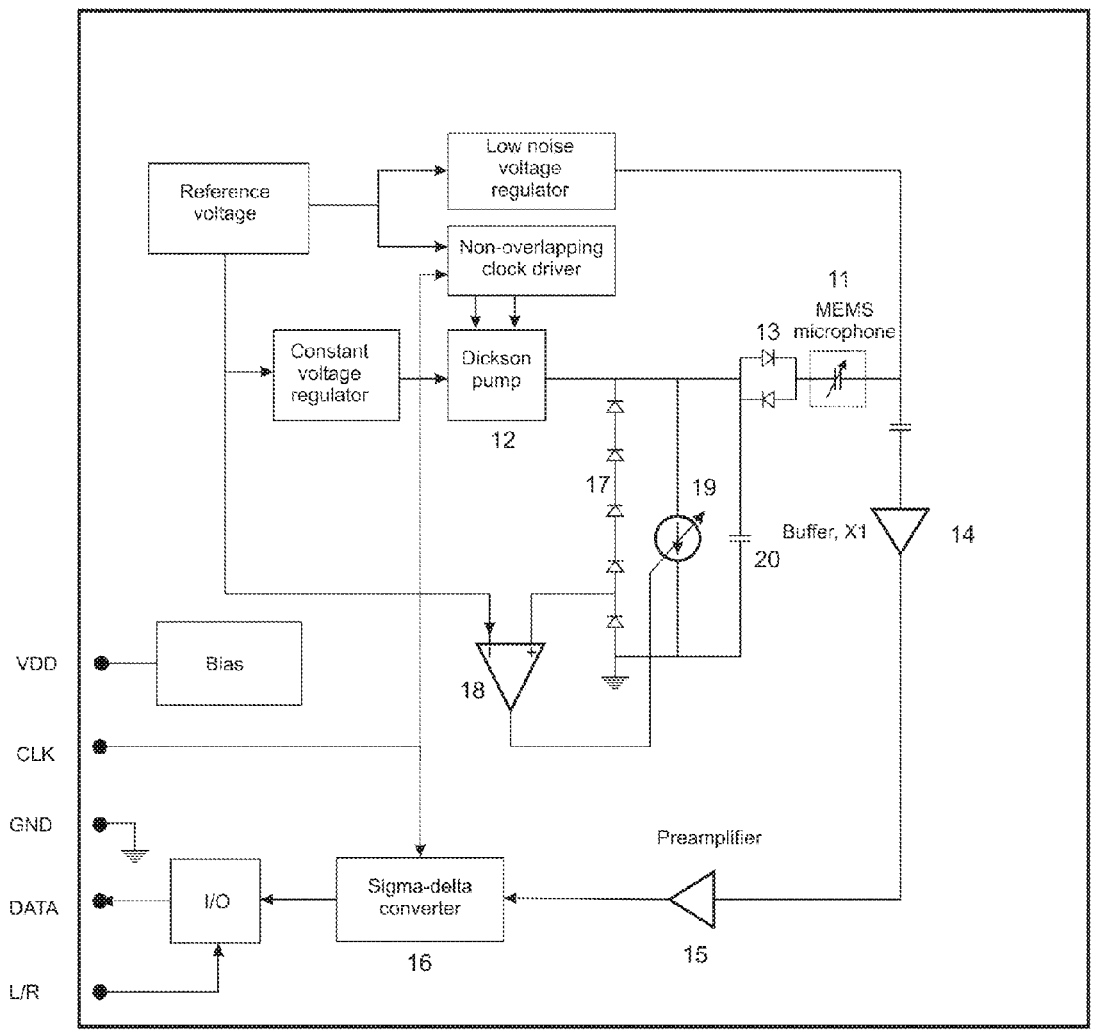
FIG. 2 shows a digital output miniature microphone assembly according to a first embodiment of the present invention.
Figure 3:
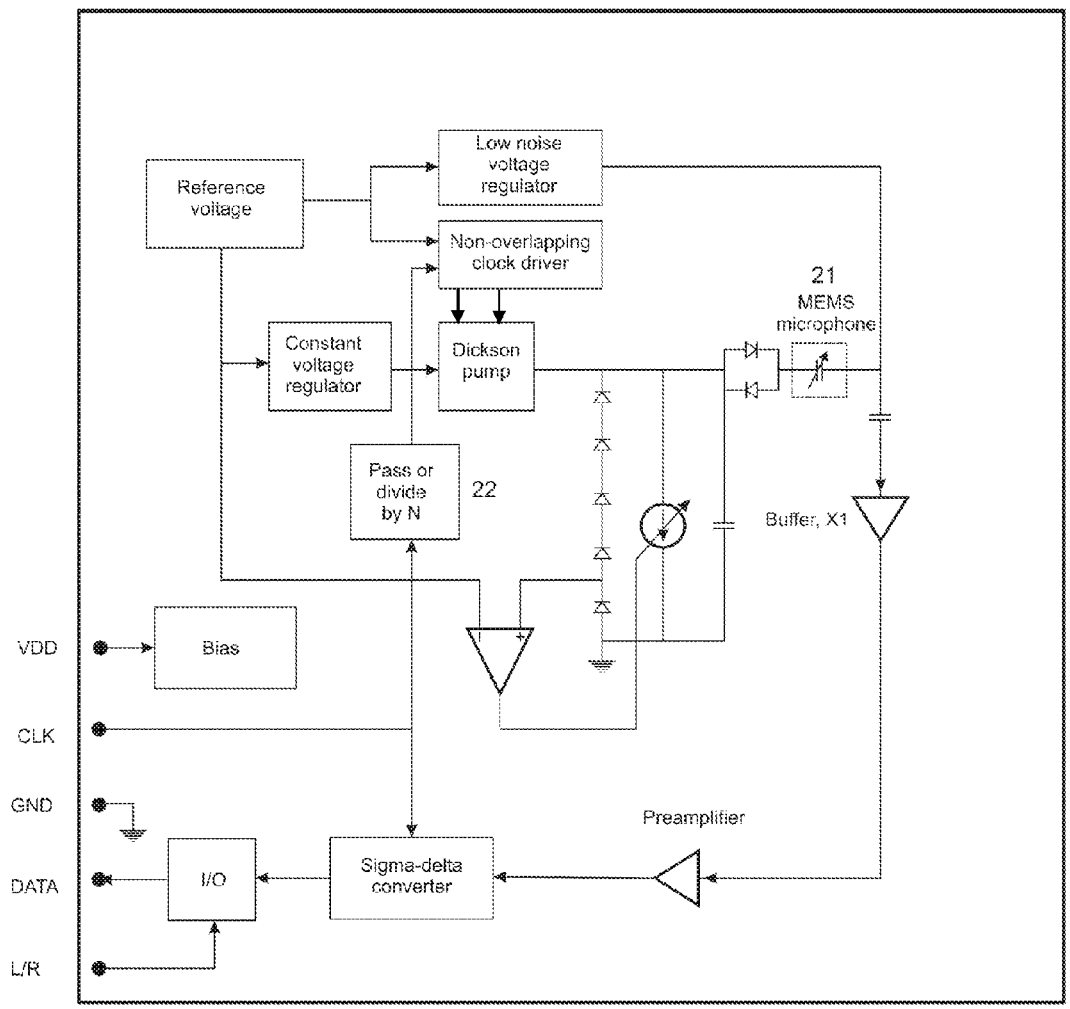
FIG. 3 shows a digital output miniature microphone assembly according to a second embodiment of the present invention.
Figure 4:
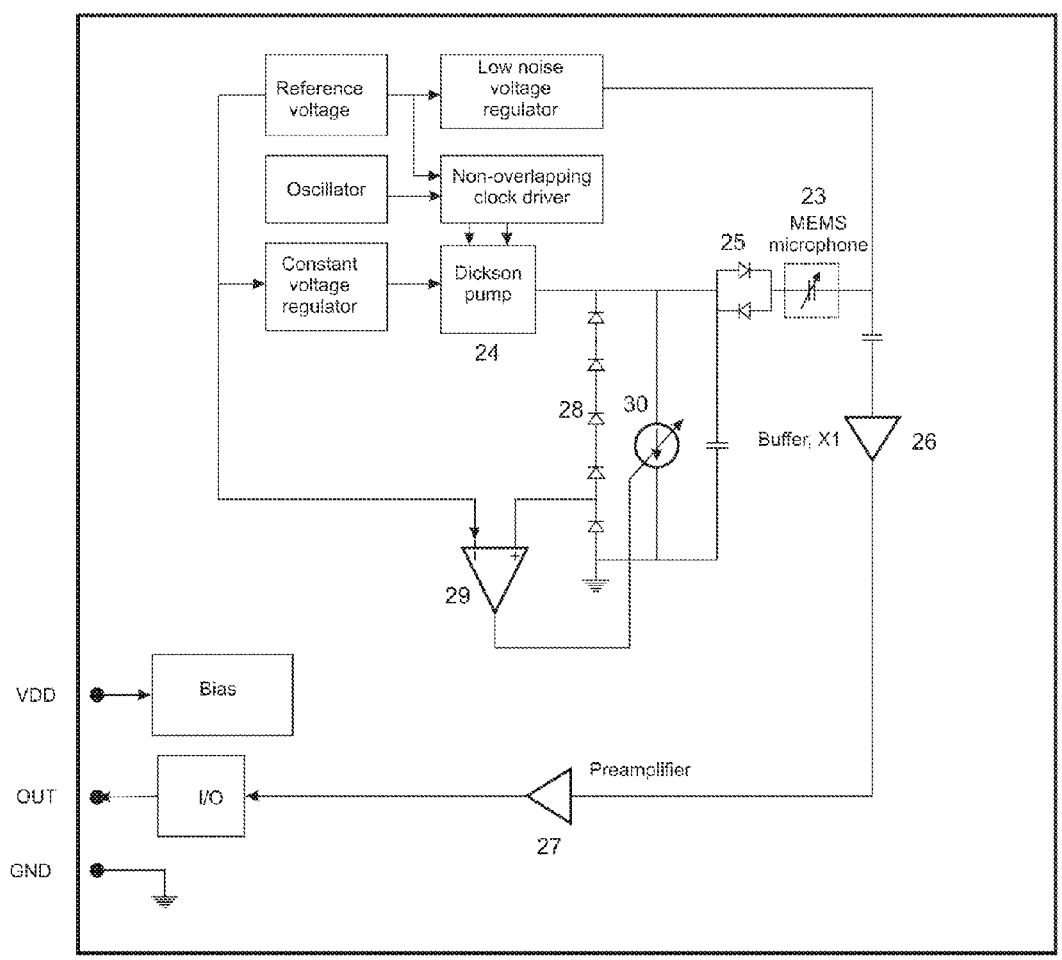
FIG. 4 shows an analog output miniature microphone assembly according to a third embodiment if the present invention.

FIGS. 2-4 show various embodiments of condenser microphone assemblies according to the present invention. Except for a few modifications the microphone assemblies shown in FIGS. 2 and 3 are identical.

Referring now to FIG. 2 a digital miniature microphone assembly according to a first embodiment of the present invention is depicted. The assembly of FIG. 2 comprises a MEMS, preferably silicon-based, miniature transducer element 11 comprising a diaphragm and a back-plate operatively connected to a Dickson pump 12. The Dickson pump 12 generates a DC bias voltage of around 10V which is applied, via a pair of cross-coupled diodes 13, as a voltage difference between the diaphragm and the back-plate of the miniature MEMS transducer element 11. The cross-coupled diodes 13, which secure an essentially constant charge state of the transducer element 11, provide an impedance in at least the GΩ range and more preferably in the TΩ range.

The electrical output signal from the transducer element 11 is passed through an optional buffer 14 having a very high input impedance. The term very high input impedance is to be interpreted as an input impedance being larger than 10 GΩ or 100 GΩ, or even more preferably larger than 1000 GΩ. A low-noise preamplifier 15 is operatively coupled to the buffer 14 to amplify the electrical signal with about 6-20 dB before the amplified electrical signal reaches an A/D converter 16 in the form of a sigma-delta converter.

The illustrated programming interface comprises Data, Clock and ground lines and it may be a customized/proprietary or an industry-standard type of programming interface. The programming interface is preferably a bi-directional interface, such as a bi-directional IIC bus interface that supports transmission of data from the A/D converter 16 and receipt of data transmitted to the assembly from, for example, a test computer adapted to configure the assembly for test mode operation. The programming interface may alternatively comprise a one-wire digital data interface with a single data line and ground line. According to another embodiment of the invention, the programming interface comprises Serial Low-power Inter-chip Media Bus (SLIMbus™) in accordance with the specification of the MIPI alliance.

Moreover, the assembly of FIG. 2 comprises a diode-based voltage divider 17, an error amplifier 18, controllable current source 19, and a noise-filtering capacitor 20. As previously mentioned, the controllable current source 19 is activated, i.e. removes charges from the Dickson pump, when the output voltage from the Dickson pump 12 exceeds a predetermined reference value. The voltage divider is implemented as a cascade of diodes coupled between the output voltage of the Dickson pump and ground.

FIG. 3 shows a digital condenser microphone assembly comprising a MEMS miniature transducer element 21. Compared to the assembly depicted in FIG. 2, the assembly of FIG. 3 comprises a programmable clock divider 22. The clock divider 22 is adapted to divide an applied (master) clock signal, provided on externally accessible terminal, CLK, with a programmable integer factor, N. The applied master clock signal may have a clock frequency between 1 and 10 MHz and may be applied without further division to the sigma-delta converter 16. The programmable clock divider 22 is arranged to either pass the master clock signal, CLK, directly to the non-overlapping clock driver or to divide CLK with an integer factor N. The non-overlapping clock driver supplies clock signals of appropriate phase to the Dickson pump 12. According to the present embodiment of the invention, the programmable clock divider 22 is arranged to, during ramp-up of the DC bias voltage, pass the CLK without division to ensure fast ramp-up. Once the ramp-up phase of the DC bias voltage is complete, the programmable clock divider 22 is programmed to divide CLK with a factor of N, where N may be any suitable integer between 2 and 64 such as 2, 4, 6, 8, 16 or 32. By reducing the clock frequency supplied to the non-overlapping clock driver CLK-related generation of noise on supply and ground/substrate connections will be lowered as well. This results in a reduced noise level on the output voltage of the Dickson pump, on the DC bias voltage and possibly on the output of the preamplifier. Operation of the programmable clock divider 22 may be controlled in several ways. In one embodiment, the control can be provided by a small state machine integrated on an integrated circuit together with the other circuit blocks described above. In an alternative embodiment, the programmable clock divider 22 is controlled by information transmitted through the programming interface.

Referring now to FIG. 4, an analog miniature microphone assembly is depicted. The assembly of FIG. 4 also comprises a MEMS miniature transducer element 23 comprising a diaphragm and a back-plate operatively connected to a Dickson pump 24. The Dickson pump 24 generates a DC bias voltage of around 10V which is applied, via a pair of cross-coupled diodes 25, as a voltage difference between the diaphragm and the back-plate of the miniature transducer element 23. The electric output signal from the transducer element is passed through a buffer 26 and a low-noise preamplifier 27 before reaching an output node of the assembly in analog format for example in balanced or unbalanced format.

In addition, a voltage divider 28, an error amplifier 29, controllable current source 30, and a noise-filtering capacitor 31 is provided. As already described, the controllable current source 30 is activated when the output voltage from the Dickson pump 24 exceeds a predetermined reference value.

The invention claimed is:

1. A condenser microphone assembly, comprising:
  a capacitive electro-acoustic transducer element comprising a diaphragm and a back-plate operatively connected to a DC bias voltage;
  a charge pump adapted to generate the DC bias voltage; and
  a controllable or programmable current source operatively connected to the DC bias voltage to draw a predetermined DC current there from when an output voltage of the charge pump exceeds a predefined value so as to maintain a low output impedance of the charge pump under start-up and steady-state loading, wherein the controllable or programmable current source is responsive to a difference between a representative of a detected DC bias voltage and a DC reference voltage to maintain a substantially constant DC bias voltage under steady-state loading.

2. A condenser microphone assembly according to claim 1, further comprising a voltage divider operatively connected to the DC bias voltage of the charge pump, said voltage divider being adapted to provide the representative of the detected DC bias voltage.

3. A condenser microphone assembly according to claim 2, further comprising an error amplifier for comparing the representative of the detected DC bias voltage and the DC reference voltage, the error amplifier being adapted to generate a control signal in response to said comparison and apply said control signal to control the controllable or programmable current source.

4. A condenser microphone assembly according to claim 3, further comprising a voltage generator circuit adapted to generate the DC reference voltage.

5. A condenser microphone assembly according to claim 1, wherein the DC bias voltage is provided to the electro-acoustic transducer element via a high impedance circuit.

6. A condenser microphone assembly according to claim 5, wherein the high impedance circuit comprises a pair of cross-coupled diodes.

7. A condenser microphone assembly according to claim 1, further comprising a noise filtration capacitor operatively connected to the DC bias voltage.

8. A condenser microphone assembly according to claim 1, further comprising signal processing circuitry operationally connected to the electro-acoustic transducer element so as to process signals generated by said transducer element.

9. A condenser microphone assembly according to claim 8, wherein the signal processing circuitry comprises a buffer or a preamplifier operationally connected to the electro-acoustic transducer.

10. A condenser microphone assembly according to claim 9, wherein the signal processing circuitry further comprises an A/D converter operationally connected to the buffer or preamplifier.

11. A DC voltage supply circuitry for generating a DC bias voltage for being applied as a DC voltage difference between a diaphragm and a back-plate of an associated capacitive electro-acoustic transducer element, the DC voltage supply circuitry comprising:
a semiconductor die comprising a charge pump for generating and providing the DC bias voltage for the capacitive electro-acoustic transducer element when an output voltage of the charge pump exceeds a predefined value so as to maintain a low output impedance of the charge pump under start-up and steady-state loading; and
a controllable or programmable current source operatively connected to the DC bias voltage, wherein the current source is controllable in response to a comparison between a representative of a detected DC bias voltage and a DC reference voltage to maintain a substantially constant DC bias voltage under steady-state loading.

12. A DC supply circuitry according to claim 11, further comprising a voltage divider operatively connected to the DC bias voltage, said voltage divider being adapted to provide the representative of the detected DC bias voltage.

13. A DC supply circuitry according to claim 11, further comprising an error amplifier for comparing the representative of the detected DC bias voltage and the reference DC voltage, the error amplifier being adapted to generate a control signal in response to said comparison and apply said control signal to control the controllable or programmable current source.

14. A DC supply circuitry according to claim 11, further comprising a noise filtration capacitor operatively connected to the DC bias voltage.

15. A DC supply circuitry according to claim 11, further comprising a voltage generator adapted to generate the reference DC voltage.

16. A method for generating a DC bias voltage to be applied as a DC voltage difference between a diaphragm and a back-plate of a capacitive electro-acoustic transducer element, the method comprising:
applying a clock signal to a charge pump for generating and providing the DC bias voltage when an output voltage of the charge pump exceeds a predefined value so as to maintain a low output impedance of the charge pump under start-up and steady-state loading;
providing the DC bias voltage to a controllable or programmable current source of the capacitive electro-acoustic transducer element;
comparing a representative of a detected DC bias voltage and a reference DC voltage;
generating, in response to said comparison, a control signal; and
controlling the current source in response to the control signal to maintain a substantially constant DC bias voltage under steady-state loading.

17. A method according to claim 16, wherein a current load of the current source falls within a first current range if the representative of the measured DC bias voltage is smaller than the reference DC voltage.

18. A method according to claim 16, wherein a current load of the current source falls within a second current range if the representative of the measured DC bias voltage is higher than the reference DC voltage.

19. A method according to claim 18, wherein current loads of the second current range are higher than current loads of the first current range.

20. A condenser microphone assembly, comprising,
a capacitive electro-acoustic transducer element comprising a diaphragm and a back-plate;
a semiconductor die comprising a voltage multiplier for generating and providing a DC bias voltage via an output terminal when an output voltage of the voltage multiplier exceeds a predetermined value so as to maintain a low output impedance of the voltage multiplier under start-up and steady-state loading, said DC bias voltage being applied as a DC voltage difference between the diaphragm and the back-plate; and
a controllable or programmable current source operatively connected to the output terminal of the voltage multiplier, the controllable or programmable current source being controllable in response to a comparison between a representative of a detected DC bias voltage level and a reference voltage level to maintain a substantially constant DC bias voltage under steady-state loading.

* * * * *